United States Patent [19]

Brown et al.

[11] Patent Number: 4,490,661
[45] Date of Patent: Dec. 25, 1984

[54] CONTROL SYSTEM FOR SYNCHRONOUS BRUSHLESS MOTORS UTILIZING TORQUE ANGLE CONTROL

[75] Inventors: Lynnie B. Brown, Roanoke; Charles J. Ford, III; Richard F. Dugan, both of Blacksburg, all of Va.

[73] Assignee: Kollmorgen Technologies Corporation, Dallas, Tex.

[21] Appl. No.: 518,130

[22] Filed: Jul. 28, 1983

[51] Int. Cl.³ .............................................. G05B 1/06
[52] U.S. Cl. ................................... 318/661; 318/254; 318/715
[58] Field of Search ................... 318/138, 254 A, 254, 318/439, 314, 722, 661, 715; 363/132

[56] References Cited

U.S. PATENT DOCUMENTS

| | | | |
|---|---|---|---|
| 3,345,547 | 10/1967 | Dunne | 318/138 |
| 3,753,067 | 8/1973 | Milligan | 318/314 |
| 3,766,458 | 10/1973 | Nishimura et al. | 318/314 |
| 4,135,235 | 1/1979 | Baker | 363/132 X |
| 4,223,261 | 9/1980 | White | 318/722 X |
| 4,334,179 | 6/1982 | Grimes et al. | 318/661 |

FOREIGN PATENT DOCUMENTS 91683  6/1982  Japan .................................. 318/254

OTHER PUBLICATIONS

Slemon, et al., *IEEE Transactions on Industry Applications*, vol. IA-9, No. 2, Mar./Apr. 1973, pp. 216-219.
Hafle, et al., *Control Engineering*, vol. 22, No. 8, Aug. 1975, pp. 39-40.

*Primary Examiner*—J. V. Truhe
*Assistant Examiner*—Bentsu Ro
*Attorney, Agent, or Firm*—Morgan, Finnegan, Pine, Foley & Lee

[57] ABSTRACT

In an improved motor control system for a pulse width modulated synchronous brushless motor, means for adaptively controlling the "torque angle", i.e. the angle between the rotating magnetic field created by the stator windings and the rotor field created by the permanent magnets on the rotor, is provided. The relationship between the two magnetic fields is controlled as a function of load and speed to provide the optimum operating point at all times. Controlling the torque angle effectively varies the back EMF constant $K_e$ (V/RPM), and the torque constant $K_+$ (torque/ampere) of the motor.

5 Claims, 5 Drawing Figures

TORQUE ANGLE PROM

| Direction | Address Lines (Direction / Speed / Torque) | Condition | Binary Output | Equivalent Angle |
|---|---|---|---|---|
| CCW | 1 1 1 1 1 1 1 1 1 1 | MAX SPEED / MAX TORQUE | 1 1 0 1 1 0 0 0 | −169° |
| CCW | 1 1 1 1 1 1 1 1 0 0 0 | MAX SPEED / 0 TORQUE | 1 1 0 1 1 1 0 0 | −152° |
| CCW | 1 0 0 0 0 0 0 0 1 1 1 | 0 SPEED / MAX TORQUE | 1 1 1 0 0 0 1 1 | −123° |
| CCW | 1 0 0 0 0 0 0 0 0 0 0 | 0 SPEED / 0 TORQUE | 1 1 1 0 1 0 1 0 | −93° |
| CW | 0 0 0 0 0 0 0 0 0 0 0 | 0 SPEED / 0 TORQUE | 1 1 1 0 1 0 1 1 | −89° |
| CW | 0 0 0 0 0 0 0 0 1 1 1 | 0 SPEED / MAX TORQUE | 1 1 1 1 0 0 1 0 | −59° |
| CW | 0 1 1 1 1 1 1 1 0 0 0 | MAX SPEED / 0 TORQUE | 1 1 1 1 1 0 0 1 | −30° |
| CW | 0 1 1 1 1 1 1 1 1 1 1 | MAX SPEED / MAX TORQUE | 1 1 1 1 1 1 0 1 | −13° |

FIG. 3

CONTROL SYSTEM FOR SYNCHRONOUS BRUSHLESS MOTORS UTILIZING TORQUE ANGLE CONTROL

BACKGROUND OF THE INVENTION

This invention relates to electric motor control systems, and more particularly, to motor control systems for DC brushless synchronous motors having torque angle control.

A DC brushless motor typically includes windings on the stator, rotating permanent magnets and a position sensing arrangement for indicating the rotor position. The winding energization is generally controlled by solid state switches that are responsive to the position indications to energize the windings in the proper commutated sequence. Motor control is achieved by controlling the magnitude of the winding excitation current. Control can be open loop or can be closed loop to control velocity, position or torque.

Although prior servo control systems using brushless DC motors have been effective in many installations, there have been limitations to the range of control that could be achieved. The developments in robotics, machine tool drives and spindle drives require smooth control over a broad range of speed, require a high smooth torque at zero speed, and require significant torque at high speeds. An object of this invention is to provide a control system for a brushless DC motor that will meet these objectives and provide for the most efficient operation of the motor.

Copending U.S. patent application Ser. No. 297,676, filed Aug. 31, 1981, now U.S. Pat. No. 4,447,771, by James S. Whited, and entitled "Control System for Synchronous Brushless Motors," describes a motor control system wherein the motor windings are energized by sinusoidal excitation currents synthesized from pre-recorded sine values. The frequency of the winding excitation currents is synchronous with the rotor movement and the phase is a function of the rotor position with respect to the stator. It has further been found that the total operational speed range of the system is substantially increased by further adjusting and controlling the phase of the excitation currents as a function of the desired speed.

In the above described control system, however, torque angle is controllable merely as a function of two parameters, i.e., the rotor position with respect to the stator and the desired speed. Torque angle does not vary as a function of load and this causes the motor to operate at less than its most efficient operating point.

SUMMARY OF THE INVENTION

Two motor constants that impose limiting constraints on DC motor control systems are the torque constant $K_t$ (torque/ampere) and the Back EMF constant $K_e$ (back EMF/RPM). The two constants are interrelated and therefore a system with a maximum torque constant also has a maximum back EMF constant.

Because of the interrelationship of these constants, a system designed for a maximum torque constant, to achieve good low speed torque, suffers from a reduced ability to produce much torque at high speeds. At the high end of the speed range where the back EMF is approaching maximum, the current that can be supplied to the motor is limited by the difference between the voltage on the supply bus and the back EMF. Since torque is directly related to current, the ability of the system to generate torque at high speed is severely limited due to the high back EMF. On the other hand, if the system is designed with a lower $K_e$ and $K_t$ to alleviate the high speed torque problem, the lowered torque constant results in a reduced torque at low speeds.

In addition, the maximum speed at which the motor can operate is limited by the approach of the internal back EMF to the supply voltage as a function of increasing speed. In many applications, it is desirable to extend the motor speed range. This can be accomplished by lowering the back EMF constant $K_e$ at higher speeds.

In accordance with this invention, it has been found that the constants $K_e$ and $K_t$ need not be regarded as fixed motor constants but in fact can be adaptively controlled. Thus, it becomes possible to have a maximum torque constant at low speeds when a high back EMF is not a problem and to also have a minimum back EMF constant at high speeds where the back EMF limits torque generation.

In a conventional brush type DC motor the constants $K_t$ and $K_e$ are dependent on the brush position which controls the commutation point. In such motors these constants are fixed as a practical matter. However, it has been found that with a brushless DC motor where commutation is controlled electronically it is possible to adaptively control the commutation point and thereby control the constants $K_t$ and $K_e$.

In the system according to this invention, sinusoidal excitation is used. The sine waves are synthesized incrementally according to rotor position and hence the frequency of the excitation currents is synchronous with motor rotation and the phase of the excitation is a function of rotor position with respect to the stator. The commutation point can then be shifted as desired by controlling the phase of the excitation current since this becomes the torque angle between the stator rotating field and the rotor position. The phase of the excitation current is controllable as a function of speed, rotor position and load, thereby providing for the most efficient operation of the motor.

An object of this invention is to allow higher speed operation, i.e., the motor can be run above "base speed" by reducing $K_e$ at higher speeds.

Another object of this invention is to obtain maximum torque at low speeds with optimum $K_t$ at low speed.

Another object of this invention is to provide very smooth torque at low speed—controlling the angle as a function of load, thus, makes it possible to compensate for magnetic saturation and flux shifting in the motor at high current levels.

Another object of this invention is to provide more efficient operation. The motor is always operating at its most efficient point; i.e., maximum torque/ampere for a given speed and load.

Another object of this invention is to provide a simple, straightforward method of programmming non-linear relationships into the control system.

Another object of this invention is to provide a simple, straightforward method of changing system parameters to accommodate for different system requirements or for different motors.

BRIEF DESCRIPTION OF THE DRAWINGS

FIG. 3 is a partial graphic illustration of the contents of a programmable read only memory in FIG. 1B.

DETAILED DESCRIPTION OF THE PREFERRED EMBODIMENT

Figure 1A:
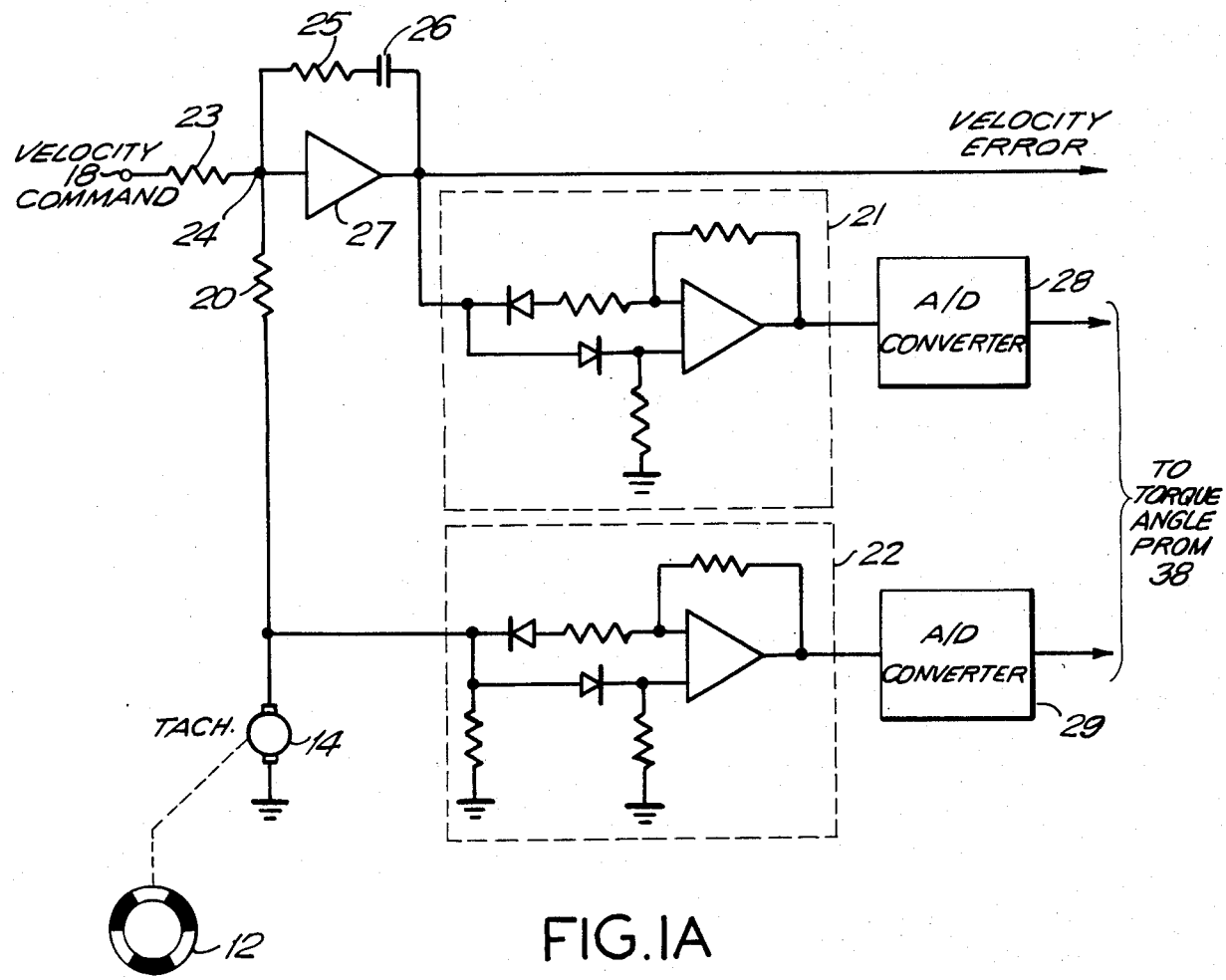
FIGS. 1A, 1B and 1C are schematic block diagrams illustrating one preferred embodiment according to the invention.
Figure 1B:
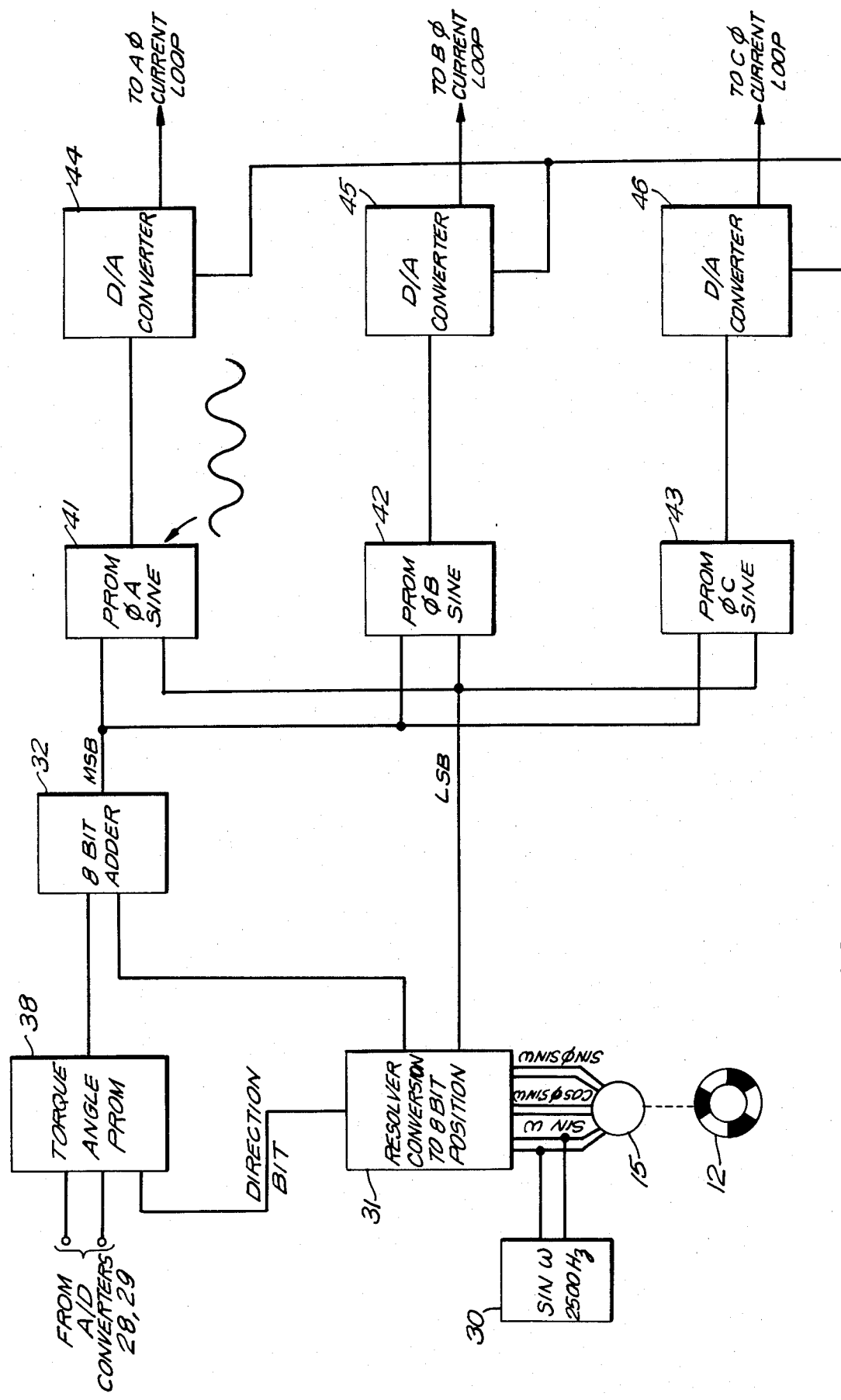
Figure 1C:
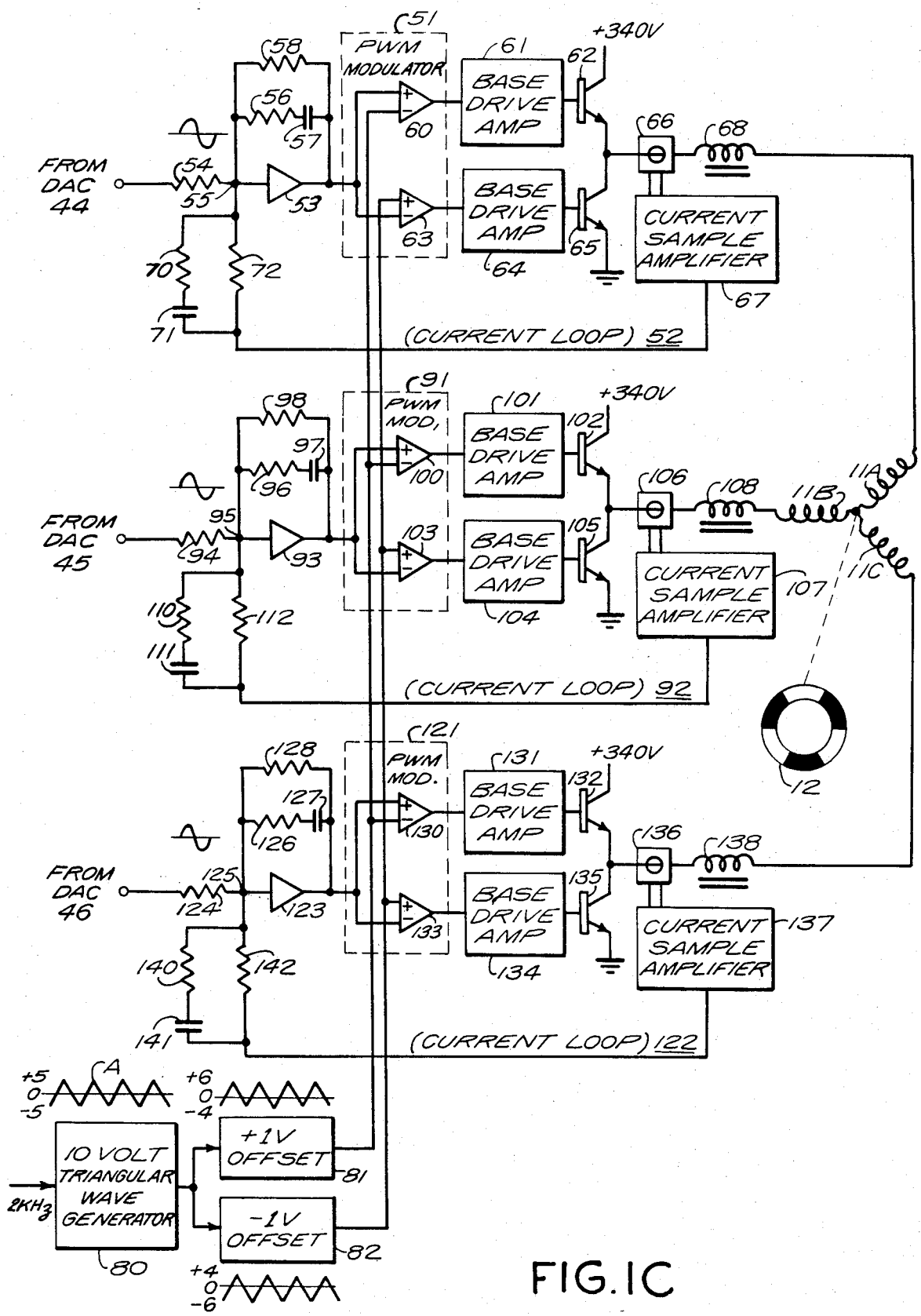

The overall schematic diagram for a motor control system according to one embodiment of the invention is shown in FIGS. 1A, 1B and 1C. The motor includes three stator windings 11A, 11B and 11C interconnected in a wye configuration and a six pole permanent magnet rotor 12. The same rotor is also shown to the left in FIGS. 1A and 1B mechanically coupled to a DC tachometer 14 and a resolver 15. The DC tachometer can be of conventional design to provide a DC voltage proportional to rotor speed with a polarity indicative of direction. The resolver provides signals indicative of rotor position.

Each winding of the motor has a separate energization section (FIG. 1C) for generating a sinusoidal drive excitation of the correct amplitude, frequency and phase for the winding. The amplitude of the excitation current is controlled by a velocity servo loop wherein the speed indication from tachometer 14 is compared with a velocity command signal at terminal 18 to provide a velocity error signal (upper portion of FIG. 1A). The frequency of the sinusoidal excitation is controlled by the rotor position information from resolver 15 (lower portion of FIG. 1B) to maintain the excitation current in synchronism with the rotation of the motor. The electrical phase position of the sinusoidal excitation current is additionally controlled by an electrical signal which operates to vary the relative phase angle between the rotor and the stator field as a function of speed and as a function of load (center portion of FIG. A). As will be explained later in more detail, the effect of this phase control is to change the motor commutation point and to thereby achieve adaptive control of the torque constant $K_t$ (torque/ampere) and the back EMF constant $K_e$ (back EMF/RPM).

The circuit for producing the velocity error signal includes an operational amplifier 27 which is a high gain integrator. One brush of DC tachometer 14 is connected to ground whereas the other brush is connected to the input of amplifier 27 at summing junction 24 via a resistor 20. Terminal 18 receives the velocity command in the form of an analog voltage having an amplitude indicating desired motor speed and a polarity indicating desired direction. Terminal 18 is connected to input of amplifier 27 via a resistor 23 and summing junction 24. A lag network consisting of a resistor 25 in series with a capacitor 26 is connected across amplifier 27. Under steady state conditions the output of amplifier 27 will be at whatever level is required to just maintain a desired operating point.

The tachometer acts as a feedback element providing a continuous indication of the actual motor speed and direction. Amplifier 27 and the related components form a summing circuit which sums the actual speed and direction signal from the tachometer with the desired speed and direction as indicated by the command signal at terminal 18 to produce the difference at the output of amplifier 27 which is referred to as the "velocity error" signal. As will be explained later, the velocity error signal controls the amplitude of the motor excitation current and, hence, the motor speed. The speed of the motor is automatically controlled in servo loop fashion so that the actual motor speed is essentially the same as the desired speed indicated by the velocity command.

Both the velocity error signal and the tachometer voltage are absolute valued by absolute value circuits 21, 22 respectively and then fed to A/D converters 28, 29. The outputs of the A/D converters as well as a direction bit on an address line from resolver-digital converter 31 (R-D converter 31) become the address lines to the torque angle PROM 38 of FIG. 1B. As shown in FIG. 3, 3 lines represent torque, 7 lines represent speed and 1 line represents direction. Thus, the torque angle is varied as a function of load, speed and direction.

Of course the number and weighting of the address lines to the torque angle PROM 38 are dependent upon actual system requirements, and only one configuration is detailed herein. For example, if 10 bit resolution is not required, an 8 bit system could easily be configured. Also, if better control as a function of torque is required, then 5 address lines could represent torque and the remaining 5 lines could represent speed.

As shown in FIG. 3, the torque angle factors recorded in the PROM 38 provide a quadrature phase relationship between the rotor field and the rotating magnetic stator field at low speeds and loads. With increasing speed and/or load, the phase relationship is either increased or decreased, depending on direction of rotation, as determined from the direction bit from the R-D converter 31. The phase at maximum speed and load can be shifted as much as 90° relative to the zero speed and torque quadrature relationship. Since any desired torque angle factor can be programmed into the PROM 38, the relationship between phase, speed, and load need not be linear, but may be any desired function. Thus, the torque angle PROM 38 contains information which, when combined with the rotor position information from the R-D converter 31, will determine the optimum position of the stator magnetic vector for any given load and speed.

Resolver 15 is of a conventional design including a rotor winding and two stator windings in quadrature. The rotor winding is energized by a suitable alternating signal sin ω which may, for example, be 2500 Hz. If Φ represents the angle between the rotor and the stator of the resolver then the quadrature windings will produce the signals sin Φ sin ω and cos Φ sin ω.

The function of the resolver and R-D converter 31 is to provide a digital word which, at all times, represents the angular position of the rotor 12. This information is used to dynamically locate the stator magnetic vector at the proper location. The resolver 15 is mounted on the motor shaft and is excited by a 2500 hz sine wave from a source 30. The resolver 15 outputs are fed into the R-D converter 31 to obtain a 12-bit digital word of which only 10 bits are used in the present embodiment of the invention. These 10 bits represent $2^{10}$, or 1024 discrete increments, for one 360 degree mechanical rotation of the rotor 12. Thus, rotor position is always known to within 360/1024 or, 0.35 mechanical degrees.

The eight higher order bits from the R-D converter 31 are added to the eight bit output of the torque angle PROM 38 using an 8-bit digital adder 32. The 8-bit result of the 8-bit adder 32, along with the two least significant bits from the R-D converter 31, represent the proper magnetic vector position for any rotor position, speed or torque.

These ten lines become the address lines for the three "sine wave" PROMS 41, 42, 43. Each PROM 41, 42, 43 has been programmed with the values for three complete cycles of a sine wave. Three cycles are needed for a six-pole motor since there are three electrical cycles for one mechanical revolution of the rotor. To generate a three-phase relationship, the sine wave values programmed in the B phase PROM 42 will lag those of the A phase PROM 41 by 120 degrees electrical. Similarly, the C phase sine wave will lag the A phase by 240 degrees electrical. The output of each sine wave PROM 41, 42, 43 is fed into a multiplying digital-to-analog converter 44, 45, 46. The reference input to each digital-to-analog converter 44, 45, 46 is the velocity loop output or velocity error signal from amplifier 27. Each digital-to-analog converter 44, 45, 46 multiplies the reference input by the digital sine wave values from each PROM 41, 42, 43 and outputs an analog voltage proportional to the two.

System operation up to this point will be briefly summarized. As the resolver 15 rotates through one complete revolution, a sequence of addresses is generated which addresses the three sine-wave PROMS 41, 42, 43. This results in a sinusoidal voltage at the output of each digital-to-analog converter 44, 45, 46. These three sinusoids are displaced 120 degrees from one another and their frequency is three times the rotor frequency of rotation. The amplitudes of the sinusoids are all equal and vary in direct proportion to the velocity loop output. The sine-wave output of each digital-to-analog converter 44, 45, 46 becomes the current command for a current loop of FIG. 1C.

The sinusoidal voltage signal appearing at the output of DAC 44 is supplied to a pulse width modulator 51 which produces pulse width current excitation to winding 11A of the motor. The amplitude of current supplied to the winding is controlled by current loop 52.

More specifically, the output of DAC 44 is connected to the input of an operational amplifier 53 via a resistor 54 and a summing junction 55. A lag network consisting of the series combination of resistor 56 and capacitor 57 in parallel with a resistor 58 is connected across the operational amplifier The amplifier output is connected to the negative input terminal of a comparator 63 and to the positive input terminal of a comparator 60. The output of comparator 60 is coupled to the base of a transistor 62 via a base drive amplifier 61. The output of comparator 63 is coupled to the base of transistor 65 via a base drive amplifier 64.

Transistors 62 and 65 are both NPN power switching transistors selected to handle the current requirements for the motor being controlled. The collector of transistor 62 is connected to a +340 volt supply, while the emitter thereof is connected to winding 11A through an inductor 68. The collector of transistor 65 is also connected to winding 11A through inductor 68 while the emitter of transistor 65 is connected to ground. Thus, when transistor 62 is conductive, winding 11A is connected to the positive supply whereas when transistor 65 is conductive, the winding is connected to ground. The inductor in series with the motor winding decreases ripple currents and associated motor heating.

The common lead from transistors 62 and 65 to inductor 68 passes through a ferrite core 66 having a linear Hall effect detector embedded therein and so located as to sense the magnetic flux in the core. The Hall detector is connected to a current sample amplifier 67. As current passes through the conductor, it creates a magnetic flux in core 66 which is sensed by the Hall detector and the amplifier in turn produces a voltage output proportional to the current passing through the lead.

The output of amplifier 67 provides the feedback to summing junction 55 to complete the current control loop. More specifically, the output of amplifier 67 is connected to summing junction 55 via a lead network, including the series combination of resistor 70 and capacitor 71 in parallel with a resistor 72. The lead network 70-72 tends to anticipate rapid signal changes and reduce overshoot and ringing in the control loop.

The pulse width modulator (PWM) 51 which includes comparators 60 and 63 receives triangular wave signals originating from a triangular wave generator 80. The triangular wave has a suitably high repetition rate such as 2 KHz and ranges from +5 volts to −5 volts peak-to-peak. The triangular wave from generator 80 is offset by +1 volt in an offset circuit 81 to provide a triangular wave having a peak-to-peak range of +6 volts to −4 volts which is supplied to the negative input terminal of comparator 60. The triangular wave from generator 80 also passes through −1 volt offset circuit 82 to provide a triangular wave with peak-to-peak values ranging from +4 volts to −6 volts which is supplied to the positive input terminal of comparator 63.

Figure 2:
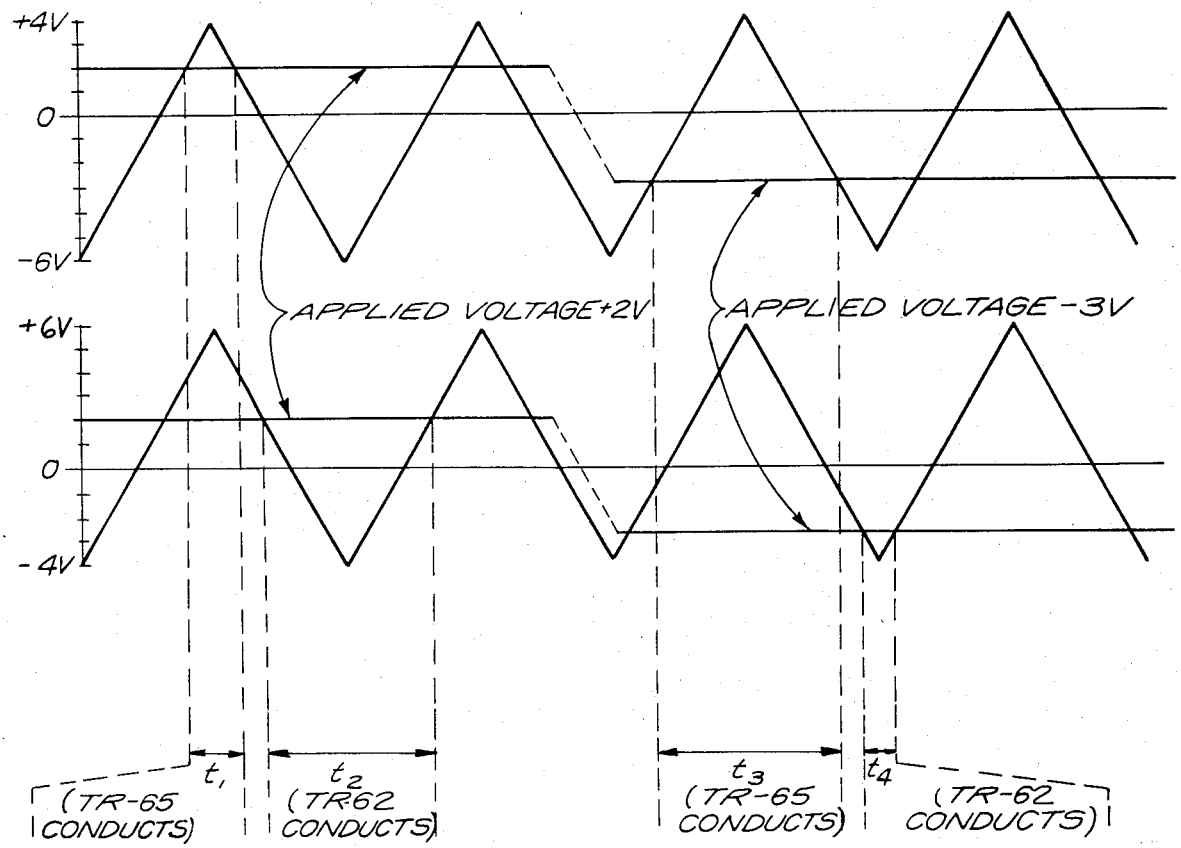
FIG. 2 is a timing diagram illustrating operation of the pulse width modulation utilized in FIG. 1C.

The operation of the pulse width modulator is illustrated in FIG. 2 which shows the two offset triangular waves applied to comparators 60 and 63. If the applied signal (output of amplifier 53 in FIG. 1C) has a +2 volts value, for example as shown to the left in FIG. 2, comparator 63 produces a logic 1 output for the interval $t_1$ during which the applied signal is more negative than the triangular wave. During interval $t_1$ transistor 65 (FIG. 1C) is conductive. During the remainder of the triangular wave cycle the comparator produces a logic 0 output and therefore transistor 65 is nonconductive. Comparator 60, on the other hand, produces a logic 1 signal during interval $t_2$ when the applied signal is more positive than the triangular wave and thereby renders transistor 62 conductive. During the remainder of the cycle transistor 62 is nonconductive since the applied signal is more negative than the triangular wave signal.

Another example is shown to the right in FIG. 2 where the applied signal has a value of −3 volts. Under these circumstances, comparator 63 produces a logic 1 output to render transistor 65 conductive during interval $t_3$ whereas comparator 60 produces a logic 1 signal during interval $t_4$ during which time transistor 62 is rendered conductive.

Thus, it can be seen that as the applied signal becomes increasingly positive, transistor 62, which connects the winding to the positive source, becomes conductive for increasingly longer portions of each operating cycle whereas transistor 65, which connects the winding to ground, becomes conductive for increasingly shorter intervals. Accordingly, increasingly positive applied voltages cause increasingly larger currents to flow through the winding. On the other hand, as the applied signal becomes increasingly negative, the conductive period for transistor 65 increases and the conductive period for transistor 62 decreases. Accordingly, the winding is connected to ground for increasingly longer periods of time and, therefore, the current flow through the winding decreases.

It should be noted in FIG. 2 that an interval always exists between the times when the two transistors are conductive. This interval is a result of the voltage offsets provided by circuits 81 and 82. this interval provides a short dead space to insure that both transistors never become conductive simultaneously to short circuit the power supply.

Thus, the current supplied to the winding is controlled by current loop 52 so that the current is proportional to the potential appearing at the output of DAC 44. As the output of DAC 44 increases, the output of amplifier 53 tends to increase thereby increasing the conductive interval for transistor 62 and the current supplied to the winding. The increase in current is detected by amplifier 67 which provides an increased feedback signal to amplifier 53 to limit the increase to the value indicated by the applied potential.

Similarly, components 91–112 form a current control loop that applies current to winding 11B proportional to the synthesized sinusoidal voltage appearing at the output of DAC 45 and components 121–142 form a current control loop that applies current to winding 11C proportional to the synthesized sinusoidal voltage appearing at the output of DAC 46.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A motor control system for a brushless DC motor comprising:
    a motor including stator windings and a rotor;
    a position indicator for providing a signal indicative of the position of said rotor relative to said stator;
    a speed indicator for providing an indication of the rotor speed;
    means for generating an indication of the load on said motor;
    a memory having torque angle factors recorded therein;
    means for selecting torque angle factors from said memory according to the indications of rotor speed and load, and adding the selected torque angle factor to the indication of rotor position to derive an excitation vector position indication; and
    excitation current generating means for applying sinusoidal excitation currents to said windings, the excitation currents having controllable phases and having values created incrementally from pre-recorded digital sine values selected in accordance with the excitation vector position indications from said means for selecting torque angle factors and the position indications from said position sensor, such that the torque angle is adaptively controlled as a function of speed and load.

2. A motor control system according to claim 1 which further includes means for receiving a command signal indicating the desired motor speed.

3. A motor control system according to claim 2 wherein said means for generating an indication of the load includes means for comparing the velocity command signal to the output of said speed indicator to provide an indication of velocity error, said velocity error being indicative of the load.

4. A motor control system according to claim 3 wherein said memory is responsive to the absolute value of the load indication and the absolute value of said speed indication.

5. A motor control system according to claim 4 wherein said memory is responsive to a direction indication provided by said position indicator.

* * * * *